No. 782,809. PATENTED FEB. 14, 1905.
W. & R. B. LOUDEN.
FEED AND LITTER CARRIER.
APPLICATION FILED NOV. 19, 1902.

2 SHEETS—SHEET 1.

Witnesses: Inventors: William Louden, Robert B. Louden

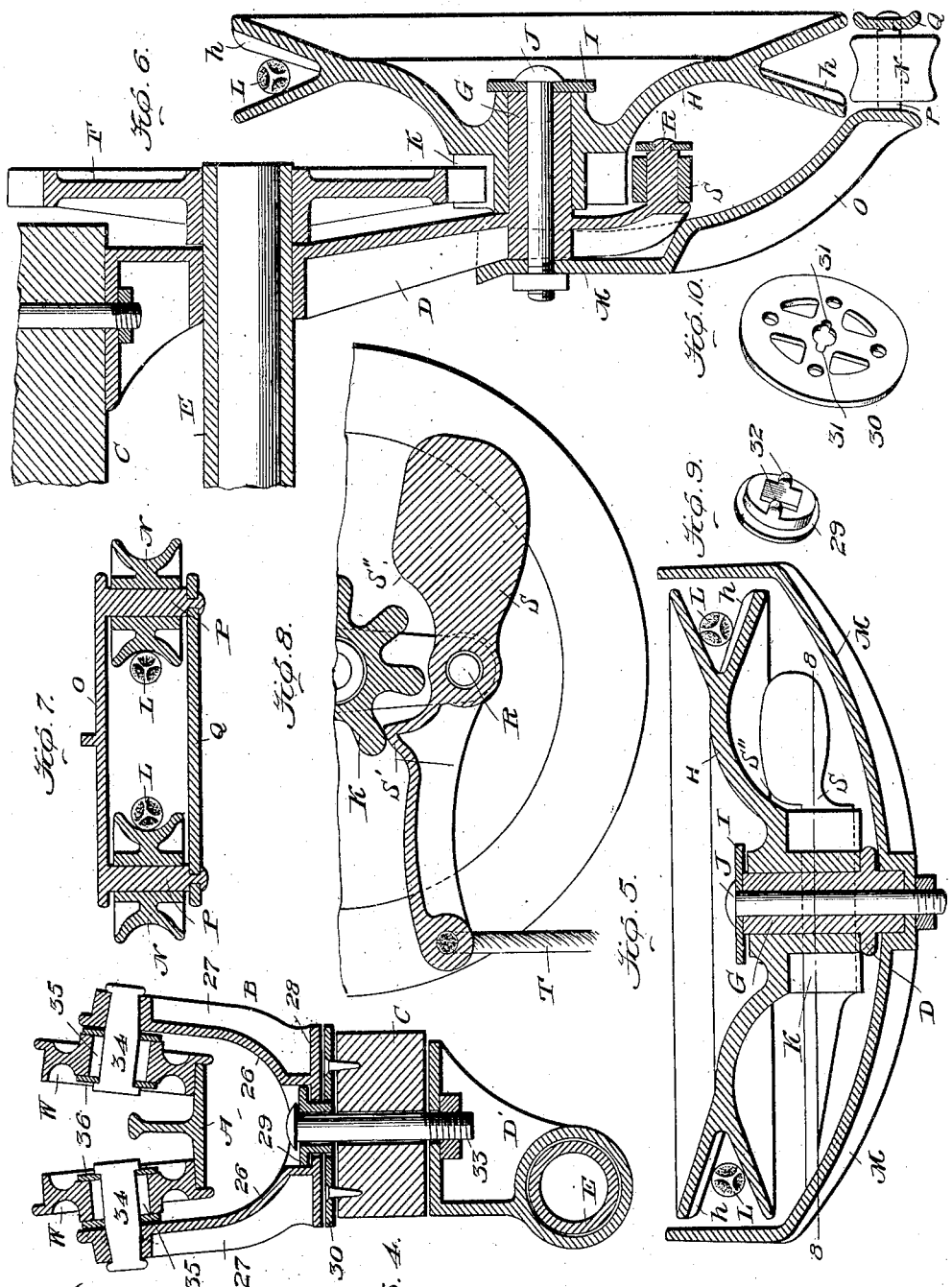

No. 782,809.  
Patented February 14, 1905.

UNITED STATES PATENT OFFICE.

WILLIAM LOUDEN AND ROBERT B. LOUDEN, OF FAIRFIELD, IOWA.

FEED AND LITTER CARRIER.

SPECIFICATION forming part of Letters Patent No. 782,809, dated February 14, 1905.

Application filed November 19, 1902. Serial No. 132,037.

*To all whom it may concern:*

Be it known that we, WILLIAM LOUDEN and ROBERT B. LOUDEN, citizens of the United States, residing at Fairfield, in the county of Jefferson and State of Iowa, have invented a new and useful Improvement in Feed and Litter Carriers, of which the following is a specification.

Our invention relates to feed or litter carriers for use in stables or other places, having for its object to provide a device which can be quickly adapted to structures where the ceilings are of different heights in order that the operating means may be brought within easy reach of the manipulator, and this is accomplished through the medium of a flexible looped depending power-transmitting device, such as a rope or chain.

The invention further contemplates the provision of novel means for permitting the carrier to travel through openings in the sides of the structure—viz., a barn, shed, or the like—and these said openings may be a door, window, or aperture made for the accommodation of the carrier, provision being made for permitting the flexible operating means to pass with the carrier into and out of the building without in any way arresting the movement of the said carrier.

Figure 1:
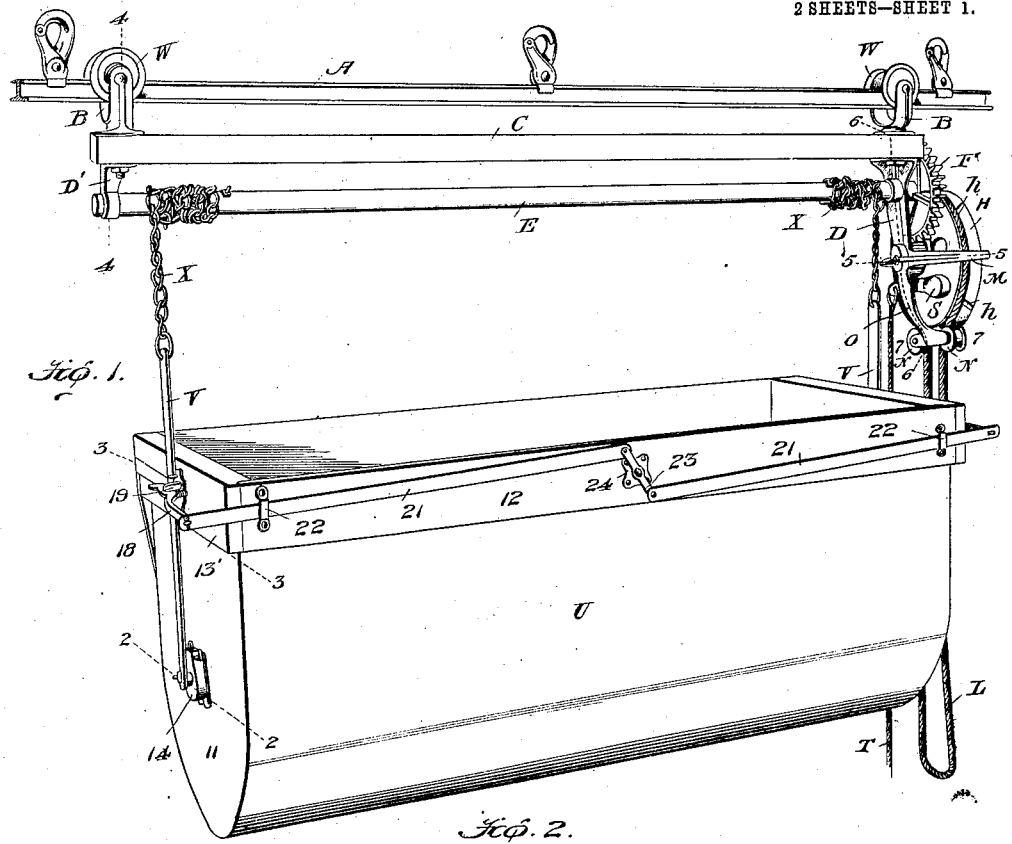
Figure 2:
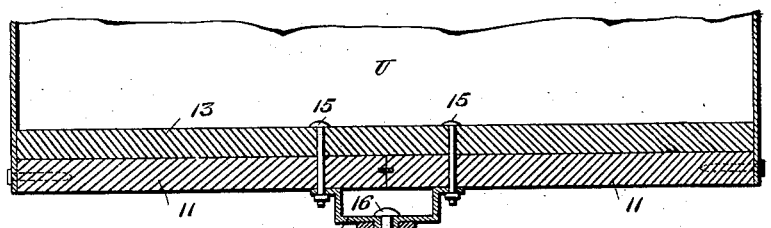
Figure 3:
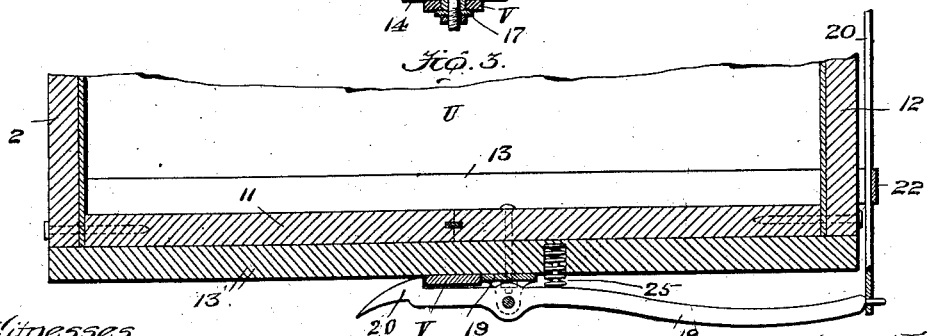

In the accompanying drawings, forming a part of this specification, Figure 1 is a perspective of a litter-carrier embodying our invention. Fig. 2 is a horizontal section of one end of the carrier-box, showing attachments on line 2 2 of Fig. 1. Fig. 3 is the same on line 3 3 of Fig. 1. Fig. 4 is a transverse vertical section on line 4 4 of Fig. 1. Fig. 5 is a horizontal section showing the gearing on line 5 5 of Fig. 1. Fig. 6 is a longitudinal vertical section of one end of the carrier, showing the gearing on line 6 6 of Fig. 1. Fig. 7 is a horizontal section on line 7 7 of Fig. 1. Fig. 8 is a vertical section on line 8 8 of Fig. 5 and showing the portion of the gearing below said line. Figs. 9 and 10 are detail views.

Referring to the drawings, A represents an elevated track-rail, upon which a pair of trucks B, carrying track-wheels W, are mounted, said trucks being connected to the upper face of a bar C at the opposite ends thereof. On the lower face of this bar and opposite the trucks B are downwardly-extending brackets D and D', each containing bearings in which a shaft E is rotatably mounted, and a gear-wheel F is affixed to the end of the shaft outside of the bracket D. This bracket D is extended below the shaft and is fitted with a tubular axle G, upon which a grooved wheel H is journaled, being held in place by the washer I and bolt J, which is passed through the axle G. Affixed to the inner side of the wheel H, so as to rotate therewith, is a smaller gear K, which is arranged to mesh in the larger gear F. An endless rope L is hung in the groove of the wheel H, and on the opposite faces of this groove ribs $h$ are formed alternately at a number of places in its circumference, so as to prevent the rope L from slipping therein. The rope is kept from getting out of the groove by means of a guard M, and it is also brought more closely in contact with the groove of the wheel by being passed through a guide having grooved wheels N set below, so as to bring the loop of the rope close together and make it nearly surround the wheel H. The inner part of this guide is formed by an extension O of the guard M, the lower ends of which are made T-shaped and are fitted with pintles P, upon which the wheels N are mounted, and to the outer ends of which a plate Q is secured to hold the wheels in place. The central portion of the guard M is recessed, so as to fit over the lower end of the bracket D, as shown in Fig. 5, and it is secured thereto by means of the bolt J.

On the extreme lower end of the bracket D is a pintle R, upon which is mounted a combined brake and ratchet S, to which a cord T is connected. It is fitted with a spur or tooth S', which is adapted to engage the gear K and hold it from turning backward when the cord T is released, the brake end S'' being sufficiently heavy to bring the spur S' in contact with the gear K. By drawing on the cord T the spur S' is disconnected from the gear K and the brake S'' is brought in contact with the inner side of the wheel H, so as to retard its movement.

The box U is suspended to the shaft E by means of two metal bars V, one of which is secured to each end of the box, and by the chains X, which are connected at their lower ends to the upper ends of the bars V and affixed at their upper ends to the shaft E near each end, so as to wind thereon. By pulling on the near side of the loop of the rope L the wheel H will be rotated, which in turn will rotate the gear F, to which the shaft E is secured, and by this means the chains V will be wound on the shaft E and the box U will be elevated and will be held suspended by the spur S' engaging a cog in the gear K. A pull on the cord T will disengage this spur from the gear K and will permit shaft E to turn backward, whereby the chains X will unwind and the box U will descend. An additional pull on the cord T will bring the brake end S" of ratchet-lever S in contact with the inner side of the wheel H, so as to retard the descent of the box. The rope L and cord T can be made any length to suit the elevation of the track A above the operator. The rope L will be kept from slipping in the groove of the wheel H by means of the ribs $h$ therein and will be held in close contact therewith by the wheels N.

The box U may be made in any suitable manner; but it is preferably made of sheet metal rounded at the bottom and secured to wooden ends 11, with strengthening-pieces 12 at the upper edges. The ends 11 are preferably made in two sections set vertically and tongued and grooved at their meeting edges and have an additional piece 13 set horizontally on the lower half of their inner sides. End pieces 13' are also affixed to the upper edges of their outer sides. The whole is joined together, so as to make the box water-tight.

The bars V are pivoted to the ends of the box U near the centers thereof by means of the casting 14, which is secured to the box by the bolts 15. The casting 14 is recessed on its inner side, and on the outer side it is fitted with a tubular projection, which is passed through a hole in the lower end of the bar V. A bolt 16 is passed through this tubular part and also through a washer 17, by means of which the bar V is held in place, so that the box will turn on said pivot.

To hold the box in upright position, so it can be loaded and will carry its load, latches 18 are pivoted to brackets 19, which are bolted to the pieces 13' on each end of the box U. These latches have their inner ends made with hooks 20, so as to catch and hold the bars V. Their outer ends are loosely joined to the outer ends of connecting-rods 21. These connecting-rods are passed through keepers 22 and have their inner ends pivoted to the opposite ends of a bar 23, which is centrally pivoted to a pintle-plate 24. In this way the latches are made to move in unison and to simultaneously engage and disengage the bars V at opposite ends of the box U. To release the bars V and permit the box to turn over and discharge its load, the outer end of one of the latches is pushed against the end of the box, which causes the hooked ends 20 to move away from the bars V and permit the box to turn on the pivots formed by the castings 14. These pivots may be placed a little to one side of the center of the box, or it can be loaded more heavily toward the front side, so as to cause it to turn and discharge its load. A spring 25 is adjusted to the latches 18, so as to hold the hooks 20 in contact with the bars V.

The trucks B are fitted with arms 26, set slightly flaring and having a circular recess in the middle, where they are joined together, and on the outside of each arm is a strengthening-rib 27. At the bottom is a circular flange joined to the lower ends of said arms and flanges and forming a circular base for the truck. In the bottom of said recess is a circular opening in which a flanged thimble 29 is inserted, the flange of the thimble being placed above, so as to come in contact with the upper side of the base 28. On the upper side of the bar C a plate 30 is affixed, having a hole in its center which has recesses 31 at opposite sides. The thimble 29 has projections 32, adapted to fit in the recesses 31. The whole is held together by a bolt 33, which also passes through the bar C and bracket D'. The thimble 29 will be held firmly against the plate 30, while the truck B will be free to turn around, and the weight of the carrier will be sustained by the flange of the thimble 29 resting on the base of the truck. The upper ends of the arms 26 are fitted with tapering openings, the upper ends of the ribs 27 being enlarged to surround these openings, and headed pins 34, carrying the wheels W and having tapering points, are inserted in said holes and riveted or otherwise secured therein. Rollers 35 are inserted in the wheel, and washers 36 may be inserted on one or both sides of the wheels to reduce the friction and make the carrier run more easily along the track. It is not to be inferred, however, that we limit ourselves to the precise construction shown.

That portion of the disclosure contained in this application which relates to the box and the latching mechanism has been divided out of this application and forms the subject-matter of a separate or divisional application, which was filed on February 4, 1904, and serially numbered 192,034.

What we claim is—

1. In a carrying device, an elevated track, trucks on the track, means for connecting the trucks, brackets movable with the trucks, a shaft rotatably mounted in the brackets, a gear-wheel on the shaft, an extension depending from one of the brackets, a gear-wheel supported thereby meshing with the gear-wheel of the shaft, means for rotating the second-named gear-wheel, and suitable connections wound on the shaft.

2. In a carrying device, the combination of an elevated track, a pair of trucks secured to the ends of a horizontally-disposed bar and having wheels adapted to run upon said track, depending brackets attached to said bar below the trucks, one of said brackets having an extension, a shaft rotatably mounted in said brackets, chains secured to said shaft and adapted to support a box, a geared wheel secured to one end of the shaft, a grooved wheel having a gear adapted to mesh in said geared wheel, said grooved wheel and its gear-wheel being supported by the extension of the bracket, and an endless rope adapted to hang in the groove of said wheel, whereby the shaft may be rotated and the chains wound thereon.

3. In a device of the character described, a shaft rotatably mounted in brackets secured to opposite ends of a horizontally-disposed bar, a geared wheel on one end of said shaft, and a grooved wheel having a gear adapted to mesh in said geared wheel, one of the brackets being extended down and provided with a journal to support said grooved wheel in position below the geared wheel.

4. In a device of the character described, brackets, one of which has a depending extension, a shaft rotatably mounted in the brackets, said brackets being secured to opposite ends of a horizontally-disposed bar, a geared wheel on one end of said shaft, a grooved wheel having a gear adapted to mesh in said geared wheel, an endless rope hung in the groove of said wheel, and guides on the depending extension of the bracket to hold the rope in position.

5. In a device of the character described, brackets suitably supported; one of said brackets having a depending extension; a shaft rotatably mounted in the brackets, said brackets being secured to opposite ends of a horizontally-disposed bar, a geared wheel on one end of said shaft, a grooved wheel mounted on the extension of the bracket and having a gear adapted to mesh in said geared wheel, an endless rope hung in the groove of said wheel, and a guide supported on the depending extension of the bracket to hold the rope in contact with the wheel.

6. In a device of the character described, a shaft rotatably mounted in brackets secured to opposite ends of a horizontally-disposed bar, a geared wheel on one end of said shaft, a grooved wheel having a gear adapted to mesh in said geared wheel, and a ratchet-lever having a spur adapted to engage said gear.

7. In a device of the character described, a bracket depending from a horizontally-disposed bar and being extended downwardly so as to support in turn a rotatable shaft having a geared wheel on its adjacent end, a grooved wheel having attached thereto a gear to mesh in said geared wheel and a ratchet-lever to engage said gear.

8. In a device of the character described, a bracket depending from a horizontally-disposed bar and being extended downwardly so as to support in turn a rotatable shaft having a geared wheel on its adjacent end, a grooved wheel having attached thereto a gear to mesh in said geared wheel, a ratchet-lever to engage said gear, and a guard adapted to be secured to the lower end of the bracket and to hold a rope in the groove of the wheel.

9. In combination, with a suitable truck and means for supporting same, a shaft, brackets depending from the truck, having bearings in which the shaft is mounted, an extension on one bracket, a gear-wheel on the shaft, a grooved wheel and a gear-wheel, a support common to the grooved and last-named gear-wheels, the said support being attached to the extension of the bracket, an endless rope hung in the groove of the wheel and ribs on the faces of the groove.

10. In a device of the character described, a truck having upwardly-extended arms, wheels mounted on said arms, a circular base, a recess in the center of said base, a flanged thimble adapted to turn in said recess and a bolt passed through said thimble so as to secure a swiveled connection between the truck and the main part of the machine.

11. In a device of the character described, a truck having upwardly-extended arms, wheels mounted on said arms, a circular base, a recess in the center of said base, a plate secured to a horizontally-disposed bar and having a hole in its center with recesses therein, a flanged thimble adapted to turn in the recess in the base of the truck and having projections adapted to fit in the recesses in the plate, and a bolt passed through said thimble, plate and bar.

12. In a carrying device, a truck having a circular base, with a perforation in its center, upwardly-projecting arms fitted with strengthening-flanges, tapering holes in the upper ends of the arms, headed pins with tapering points adapted to fit in said tapering holes, and wheels mounted upon said pins.

13. In a device of the character described, an elevated track, a pair of trucks adapted to run on said track, a horizontally-disposed bar connecting the trucks, downwardly-extending brackets secured to said bar, a rotatable shaft mounted in said brackets in line with the bar, supporting devices secured to said shaft at each end adjacent to the brackets, a box or receptacle supported at each end by said supporting devices, a grooved wheel arranged to rotate the shaft and an endless rope hung in the groove of the wheel whereby an operator below can by pulling on one side of the rope rotate the shaft and elevate the box so it may be carried along the elevated track.

14. In a carrying device, a track, trucks adapted to run thereon, a bar swiveled to the trucks, brackets depending from the bar, an extension on one of the brackets, and a shaft rotatable in the brackets.

15. In a carrier of the character described, a track, a truck thereon comprising arms, wheels and axles, an apertured base at the junction of the arms, said base having a flanged thimble extending through the opening and having the flange above the flange of the base, projections on the thimble, a plate having recesses to receive the projections and means for retaining the base, thimble and plate in operative relation.

16. In a carrier of the character described, a track, a truck thereon comprising arms, wheels and axles, an apertured base at the junction of the arms, said base having a flanged thimble extending through the opening and having a flange above the flange of the base, projections on the thimble, a plate having recesses to receive the projections, a bar to which the plate is secured and means for retaining the base, thimble and plate in operative relation.

17. In a carrier of the character described, a track, a truck thereon comprising arms, wheels and axles, an apertured base at the junction of the arms, said base having a flanged thimble extending through the opening and having a flange above the flange of the base, projections on the thimble, a plate having recesses to receive the projections, a bar to which the plate is secured, a bracket, depending from the bar and means for retaining the base, thimble, plate and bar and bracket in operative relation.

18. In a carrier, a truck having arms terminating in an apertured head, a thimble extending through the aperture and having a flange to engage the head, a bar, a plate on the bar, said plate having recesses, projections on the thimble to enter the recesses, and a bolt for retaining the parts in operative relation.

19. In a carrier, a truck having arms terminating in an apertured head, a thimble extending through the aperture and having a flange to engage the head, a bar, a plate on the bar, said plate having recesses, projections on the thimble to enter the recesses, a bracket on the lower surface of the bar and a bolt run through the thimble, plate, bar and bracket for retaining the parts in operative relation.

20. In an overhead carrier, a suitably-suspended bracket, having an axle and a portion depending below the axle; a pintle on the depending portion, parallel with the axle, a driven wheel and a gear on the axle, a detent pivoted on the pintle adapted to engage the gear and a suitable winding mechanism driven by the gear.

21. In an overhead carrier, a suitably-suspended bracket having a hollow axle and a depending portion terminating in a pintle parallel with the axle, a driven wheel and a gear mounted on the axle, a rope on the periphery of the wheel for rotating it, a guard embracing the inner end of the axle and having extensions projecting over the periphery of the driven wheel, a washer on the outer end of the axle and a bolt run through the axle, washer and guard holding the parts assembled.

22. In an overhead carrier, a suitably-suspended bracket having a hollow axle and a depending portion terminating in a pintle parallel with the axle, a driven wheel and a gear mounted on the axle, a rope on the periphery of the wheel for rotating it, a guard embracing the inner end of the axle and having extensions projecting over the periphery of the driven wheel, a depending outwardly-curved extension on the guards, pintles on the extensions parallel with the periphery of the driven wheel and wheels on the pintles.

23. In an overhead carrier; a suitably-supported bracket having an axle; a driven wheel and a gear on the axle; a guard embracing the inner end of the axle, secured thereto and having extensions overlying the periphery of the driven wheel; a rope for driving the wheel and winding mechanism driven by the gear.

24. In an overhead carrier, a bracket suitably suspended, a hollow hub integral therewith, a grooved driven wheel having ribs on its grooved surface, a rope engaging the ribs, a guard secured to the hub and extending over the periphery of the wheel, an extension depending from the guard, pintles thereon overlying the grooved periphery of the wheel and wheels on the pintles engaging the rope.

25. In an overhead carrier, a suitably-suspended bracket having a hollow axle and a depending portion terminating in a pintle parallel with the axle, a driven wheel and a gear mounted on the axle, a rope on the periphery of the wheel for rotating it, a guard embracing the inner end of the axle and having extensions projecting over the periphery of the driven wheel, a depending outwardly-curved extension on the guards, pintles on the extensions parallel with the periphery of the driven wheel, wheels on the pintles, a washer on the outer end of the axle and a bolt run through the axle, washer and guard holding the parts assembled.

26. In combination, a single line of elevated track, a carrier having trucks at each end adapted to run on said track, a bar connecting said trucks at their lower ends, bucket-supporting means secured to each end of the bar in line with and immediately below the track, a suitable gearing at one end for elevating and lowering a bucket, a wheel for rotating the carrier, and an endless hanging flexible device for driving the gear-rotating wheel.

27. In a carrying device, a single line of elevated track, a carrier with trucks at each end adapted to run on said track, brackets secured to each end of the carrier below the trucks and in line therewith, a shaft rotatable in the brackets, means whereby a receptacle is supported on each end of the shaft, a wheel for turning the shaft to raise and lower the receptacle and an endless rope operating over the wheel and extending within reach of an operator.

In testimony whereof we have signed this specification in the presence of two subscribing witnesses.

WILLIAM LOUDEN.
ROBERT B. LOUDEN.

Witnesses:
GRACE ATKINSON,
J. W. FULTON, Jr.